Sept. 15, 1953  J. E. LUCAS  2,652,084
SQUARE HOLE DRILLING BIT
Filed Aug. 12, 1948  2 Sheets-Sheet 1
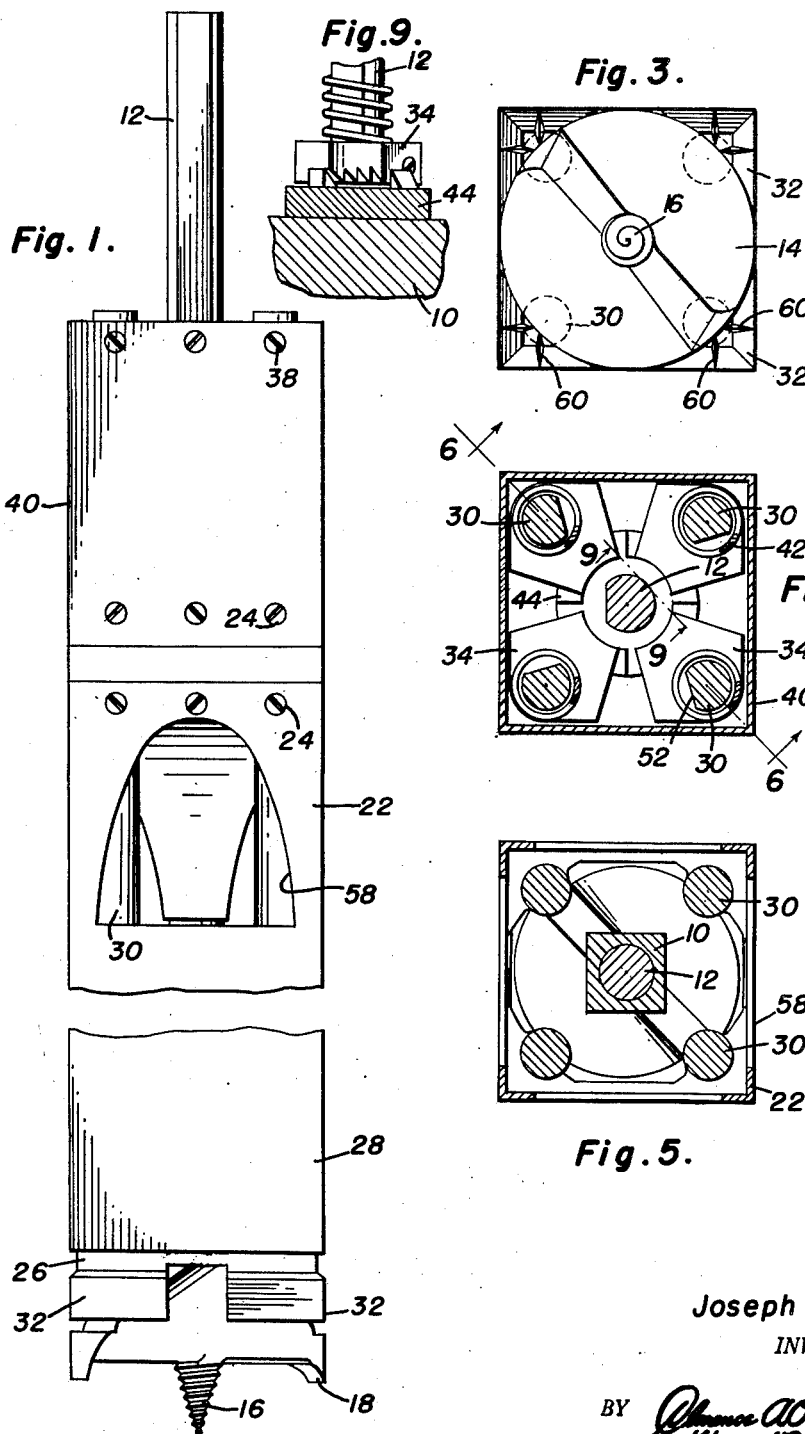
Joseph E. Lucas
INVENTOR.

Sept. 15, 1953      J. E. LUCAS      2,652,084
SQUARE HOLE DRILLING BIT
Filed Aug. 12, 1948      2 Sheets-Sheet 2
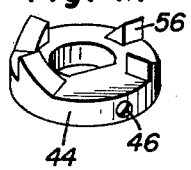
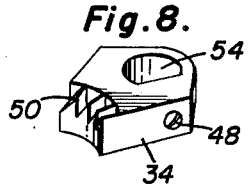
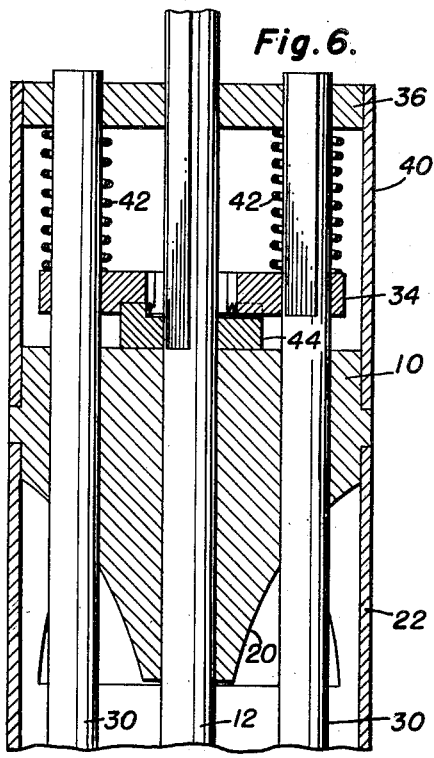
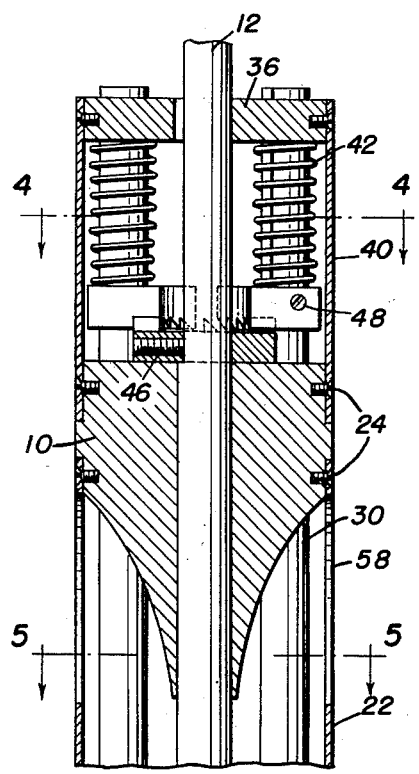
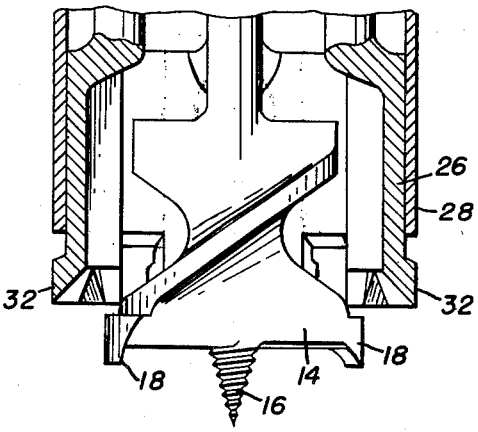
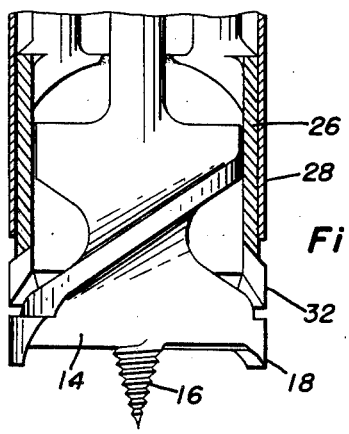
Joseph E. Lucas
INVENTOR.

Patented Sept. 15, 1953

2,652,084

UNITED STATES PATENT OFFICE 2,652,084

SQUARE HOLE DRILLING BIT

Joseph E. Lucas, Longview, Tex., assignor, by direct and mesne assignments, of thirteen-twentieths to Richard T. Wells and one-twentieth to John S. T. McDowell, both of Longview, Tex.

Application August 12, 1948, Serial No. 43,887

5 Claims. (Cl. 145—122)

This invention relates generally to square hole cutters and more particularly to a tool designed for providing square holes in wood, plastic and the like, in contra-distinction to similar devices used to provide holes in metal.

A primary object of this invention is to facilitate and simplify the production of square holes in wood, plastics and the like by means capable of incorporation in either hand tools or machine tools.

Another object of this invention is to provide a tool of this character which is so designed as to simplify replacement of an auger or of one or more of the corner cutters used in the tool, whenever such replacement is required, and cam activating means for the said corner cutters are also designed for easy and inexpensive replacement when required.

Still another object of this invention is to provide improvements in this type of tool whereby corner cutters are allowed to follow the leading cutting edge of an auger so that the work required of the corner cutters is kept at a minimum and the maintenance of the tool is thereby simplified, as removal of the corners after the cylindrical portion has been removed is considerably more simply accomplished than is the removal of the corners simultaneously with the cylindrical portion, as is attempted in other types of tools designed for the same purposes.

And a last object to be mentioned specifically is to provide a square hole cutter which is relatively inexpensive to manufacture, all the parts thereof being easily fabricated according to conventional manufacturing procedures, and to provide a tool which is safe as well as convenient to handle and which will give enduring and efficient service.

With these objects definitely in view, together with other objects which will appear hereinafter as this description proceeds, this invention resides in certain novel features of construction, combination and arrangement of elements and portions as will be hereinafter described in detail in the specification, particularly pointed out in the appended claims, and illustrated in the accompanying drawings which form a material part of this application, and in which—

Figure 1 is a side elevational view of the assembled tool;

Figure 2 is a vertical sectional view of the tool, the auger being shown in elevation;

Figure 3 is a lower plan view of the assembled tool;

Figure 4 is a transverse horizontal section, taken on the line 4—4 in Figure 2;

Figure 5 is a similar horizontal section taken on the line 5—5 in Figure 2;

Figure 6 is a vertical sectional view taken on the diagonally disposed section line 6—6 in Figure 4;

Figures 7 and 8 are three dimensional views of a cam actuator and one of the cams, respectively; and Figure 9 is a fragmentary vertical sectional view, taken on line 9—9 in Figure 4.

Similar characters of reference designate similar or identical portions throughout the specification and throughout the several views of the drawings.

Referring to the drawings in detail, this invention includes a bearing block 10 having a central bore to receive a shank portion 12 of an auger 14 which may be of substantially conventional character having a pilot point 16 and leading cutting edges 18. The block 10 will be square in cross section with a tapered portion at 20, and a shell 22, which is also square in cross section, is provided in the present embodiment in two parts which are secured by screws 24 to the block 10. A member 26, which is also square in cross section, is reciprocably mounted within the end 28 of the shell 22, this end 28 of the shell functioning as a guide for the member 26. Spindles 30 carry this member 26, the spindles being slidably mounted within bores in the block 10. The outer end of the member 26 has corner cutters 32 which may be integral with the member and the cutting edges of these cutters are tangentially disposed with reference to the leading cutting edges 18 of the auger.

Intermediate portions of the spindles, remote from the cutters 32, carry cams 34, best illustrated in Figure 8, and a transverse member 36 secured to the outer end of the portion 40 of the shell 22, by means of screws 38. A plurality of springs 42 and a cam actuator 44 secured to the shank portion 12 as at 46 are operatively associated with a plurality of cams 34 which are secured to spindles 30, as by screws 48. It will be clear, from an inspection of the figures, that rotation of the shank 12 while the block 10, shell 22 and the member 26 are prevented from rotating, will cause reciprocation of the member 26.

It is preferred to provide each cam 34 with a plurality of teeth 50 and the spindles are preferably flattened on one side, as at 52, while the cams are provided with similarly shaped bores 54 to prevent relative rotation between these parts. The cam actuator 44 has a number of teeth 56 equal to the number of cams 34 and will be positively prevented from rotating relative to the shank 12.

The shell 22 is apertured as at 58 and chips loosened by the auger and corner cutters are deflected outwardly by the tapered portion 20 of the block 10 to escape through these apertures 58. Each corner cutter 32 will be provided with inwardly projecting cutting prongs 60 which aid in cutting the wood or other substance into finer particles during the operation of the tool. It is contended that the rapid vertical motion of the corner cutting blades and member 26 will cause an air movement upwardly inside the shell 22, causing the small dust particles and chips to be blown out as they accrue.

Minor variation from the form and proportions of the elements of this invention illustrated in the above described embodiment may be resorted to without departure from the scope of this invention.

Having described the invention, what is claimed as new is:

1. A square hole cutter comprising a square bearing block, said block having an axial bore therein, an auger, a shank on said auger, said shank being journaled in said axial bore, a square shell mounted on the bearing block and rigidly secured thereto, the sides of said shell being tangential to the circular path described by the outer extremities of the cutting edges of said auger, a square member embracing the lands of said auger and slidably mounted in said shell, corner cutters secured in depending relation on said square member, the outer surfaces of said corner cutters being flush with the outer surface of said shell, a plurality of offset spindles integral with said square member, said bearing block having bearing bores slidably mounting said spindles, an outer shell portion rigidly secured to said bearing block, a transverse member carried by said outer shell, radially extending cams rigidly mounted on said spindles, a cam actuator rigidly mounted on said auger, said cams overlying said cam actuator, spring means interposed between said transverse member and said cams.

2. A square hole cutter comprising a square bearing block, said block having an axial bore therein, an auger, a shank on said auger, said shank being journaled in said axial bore, a square shell mounted on the bearing block and rigidly secured thereto, the sides of said shell being tangential to the circular path described by the outer extremities of the cutting edges of said auger, a square member embracing the lands of said auger and slidably mounted in said shell, corner cutters secured in depending relation on said square member, the outer surfaces of said corner cutters being flush with the outer surface of said shell, auxiliary cutting prongs on said corner cutters, a plurality of offset spindles integral with said square member, said bearing block having bearing bores slidably mounting said spindles, an outer shell portion rigidly secured to said bearing block, a transverse member carried by said outer shell, radially extending cams rigidly mounted on said spindles, a cam actuator rigidly mounted on said auger, said cams overlying said cam actuator, spring means interposed between said transverse member and said cams.

3. A square hole cutter comprising a bearing block an auger axially journaled in said block, a square shell rigidly connected to said block, a square member embracing said auger and slidably mounted in said shell, corner cutters on said square member, the outer edges of said corner cutters being tangential to the circular path described by the outer extremities of the cutting edges of said auger, a plurality of spindles integral with said square member, said bearing block having bores slidably mounting said spindles, an upper shell portion rigidly secured to said bearing block, a transverse member secured in said upper shell, said spindles passing through openings in said transverse member, compression means urging said spindles forward, cam means connected to said spindles and a cam actuator operatively connected to said auger intermittently displacing said spindles against said compression means.

4. A square hole cutter comprising a bearing block, an auger axially journaled in said block, a square shell rigidly connected to said block, side apertures in said shell and curved guide surfaces on said bearing block for delivering chips from said cutter, a square member embracing said auger and slidably mounted in said shell, corner cutters on said square member, the outer edges of said corner cutters being tangential to the circular path described by the outer extremities of the cutting edges of said auger, a plurality of spindles integral with said square member, said bearing block having bores slidably mounting said spindles, an upper shell portion rigidly secured to said bearing block, a transverse member secured in said upper shell, said spindles passing through openings in said transverse member, compression means urging said spindles forward, a driving connection between said auger and said spindle including cam means intermittently displacing said spindles against said compression means.

5. A square hole cutter comprising a bearing block, an auger axially journaled in said block, a square shell rigidly connected to said block, a square member embracing said auger and slidably mounted in said shell, corner cutters on said square member, the outer edges of said corner cutters being tangential to the circular path described by the outer extremities of the cutting edges of said auger, inwardly directed cutting prongs on said corner cutters, a plurality of spindles integral with said square member, said bearing block having bores slidably mounting said spindles, an upper shell portion rigidly secured to said bearing block, a transverse member secured in said upper shell, said spindles passing through openings in said transverse member, compression means urging said spindles forward, cam means secured to said spindles and driven by a cam actuator operated by said auger intermittently displacing said spindles against said compression means.

JOSEPH E. LUCAS.

References Cited in the file of this patent

UNITED STATES PATENTS

| Number  | Name         | Date          |
|---------|--------------|---------------|
| 333,662 | Patterson    | Jan. 5, 1886  |
| 468,417 | Farmer       | Feb. 9, 1892  |
| 541,780 | Wallner      | June 25, 1895 |
| 617,473 | Parsley et al. | Jan. 10, 1899 |
| 625,008 | Wood         | May 16, 1899  |
| 788,941 | Pearl        | May 2, 1905   |
| 956,474 | Brown        | Apr. 26, 1910 |